United States Patent
Bachta

(10) Patent No.: US 6,357,122 B2
(45) Date of Patent: *Mar. 19, 2002

(54) PLUNGE DRYWALL SAW

(75) Inventor: Robert P. Bachta, McHenry, IL (US)

(73) Assignee: Vaughan & Bushnell Manufacturing Company, Hebron, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,468

(22) Filed: Aug. 14, 1999

(51) Int. Cl.⁷ .................................. B26B 3/08
(52) U.S. Cl. ............... 30/355; 30/144; 30/514
(58) Field of Search .......................... 30/355, 357, 340, 30/317, 514, 144

(56) References Cited

U.S. PATENT DOCUMENTS

| | | | |
|---|---|---|---|
| 1,171,241 A | * 2/1916 | Potter | 30/355 X |
| 4,907,344 A | * 3/1990 | Hahn | 30/355 |
| 5,448,833 A | 9/1995 | Coon | 30/142 |
| 5,687,484 A | 11/1997 | Hahn | |
| 5,692,308 A | 12/1997 | Di Libero | |

* cited by examiner

Primary Examiner—Douglas D. Watts
(74) Attorney, Agent, or Firm—Lackenbach Siegel

(57) ABSTRACT

A hand saw for penetrating and cutting drywall, comprising a handle, an elongated blade having generally opposed blade top and bottom edges, the blade top edge being flat and said blade bottom edge having saw teeth for cutting drywall, the blade having an inner end and an opposed free end area, the inner end being attached to the handle and the free end area having a tapered sharpened cutting edge extending from the blade bottom edge at the saw teeth to the blade top edge. The cutting edge is formed by a pair of inwardly tapered flat surfaces of the blade between the blade top and bottom edges at the free end area that converge at the sharpened cutting edge. A pointed tip is defined by the blade flat top side and the tapered cutting surface and the pair flat surfaces and by the blade flat top side. A hand stop is connected to the top side of the handle. The blade bottom edge is slightly tapered upwardly relative to the blade top edge between the handle and the free end area at the sharpened cutting edge.

10 Claims, 7 Drawing Sheets

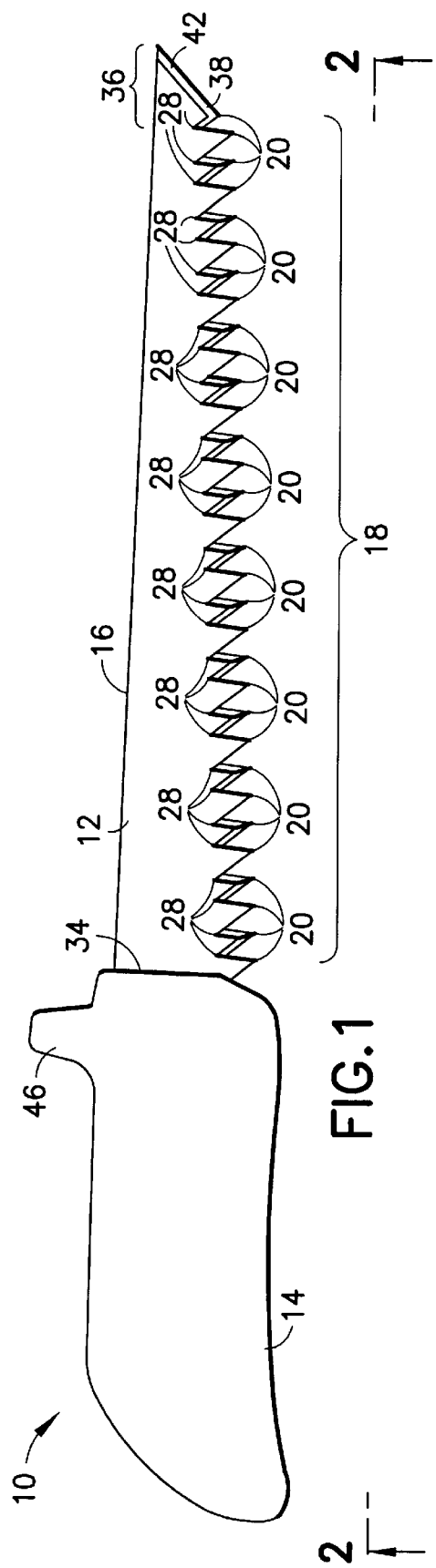
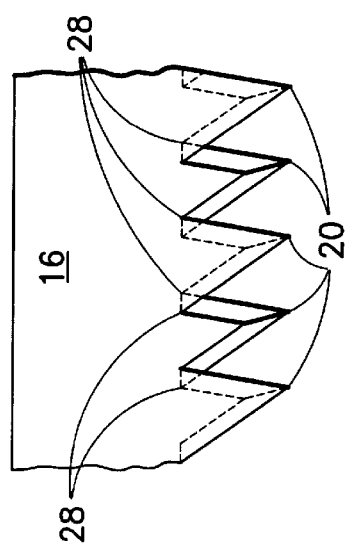

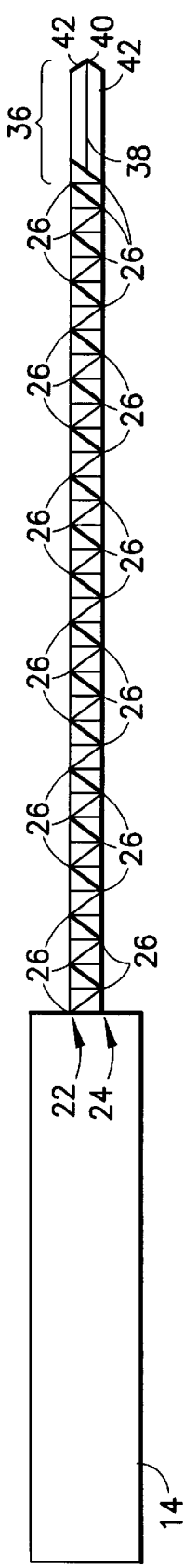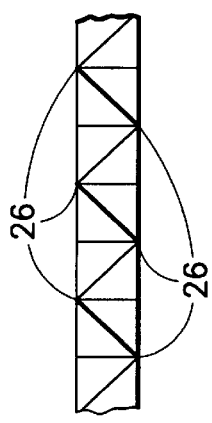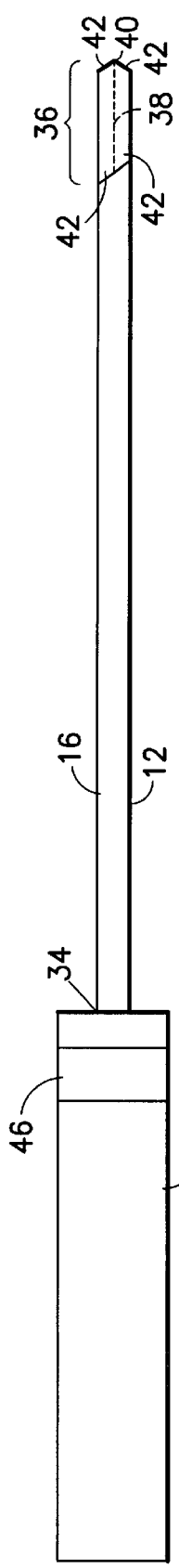

PLUNGE DRYWALL SAW

FIELD OF THE INVENTION

The present invention relates to a hand tool for cutting drywall.

BACKGROUND OF THE INVENTION

Drywall, also known as plaster board or as sheet rock, is generally prepared for installation as a wall overlay at building construction sites by cutting large standard-sized units of drywall into dimensions that fit the particular on-site requirements. Drywall is made of a gypsum composition and is firm and resistant to penetration and crumbles in the particular areas where sawed. The task of sawing is generally accomplished by a special hand saw. Because of the nature of drywall, the drywall saw has offset cutting teeth of various configurations known in the art that do not bind during the cutting. The cutting teeth are specially adapted to remove crumbled drywall material during the sawing operation. When a first cut at the top edge or side edge of the drywall sheet cannot accomplish the sizing task at hand, an initial cut must be made through a particular area of the drywall, in which case a special tool is required to create a keyhole through a selected area of the drywall to allow subsequent access by the drywall saw.

Drywall saws presently known in the art do not have the capability of penetrating the flat side of a drywall.

A drywall saw with a sharp point is described in U.S. Pat. No. 5,448,833 issued to Coon on Sep. 12, 1995. An embodiment of the hand saw therein shown in FIGS. 10 and 11 shows a blade with saw teeth on the underside cutting surface and a sharpened edge 38 functioning as a knife on the opposed topside surface. Although the purpose of the knife edge therein is only to be used as an all purpose knife, FIG. 6 therein describes a pointed tip 13 that is enhanced in FIGS. 10 and 11 that could be used to penetrate a drywall slightly with either a thrusting motion or with a more powerful plunging motion by a user gripping the handle of the knife in a gripping mode with the fingers over the top of the handle. Nowhere does the Coon patent describe such a use for its drywall saw.

The Coon invention is unable to create a keyhole in the drywall because the underside of the Coon blade is flat and would exert resistant pressure against the drywall during an imagined power stroke with the user using a plunging, downwardly arced motion. During such an attempted plunging motion, assuming a user exerted maximum power by a finger overgrip position relative to the handle, the path of the blade would arc when striking with force against the drywall, whether the drywall is vertical or horizontal. Thus the flat surface bottom surface of the Coon hand saw would be pressured against the surface of the drywall during such an imagined plunging motion after initial entry of the point of the hand saw rather than the upper sharp knife edge of the saw. Thus, the Coon embodiment does not do away with the necessity of having a second tool to create a keyhole entry for secondary penetration by the drywall saw.

SUMMARY OF THE INVENTION

It is therefor an object of the present invention to provide a hand saw for cutting drywall that also can be used to penetrate a sheet of dry wall at a selected position in order to make a hole through the sheet of drywall that will accept the blade of the hand saw for subsequent sawing of the drywall for sizing in accordance with a required dimension.

In accordance with this object and other objects that will become apparent in the course of this disclosure, there is provided a hand saw for penetrating and cutting drywall, comprising a handle, an elongated blade having generally opposed blade top and bottom edges, the blade top edge being flat and said blade bottom edge having saw teeth for cutting drywall, the blade having an inner end and an opposed free end area, the inner end being attached to the handle and the free end area having a tapered sharpened cutting edge extending from the blade bottom edge at the offset saw teeth to the blade top edge. The sharpened cutting edge is formed by a pair of inwardly tapered flat surfaces of the blade between the blade top and bottom edges at the free end area that converge at the sharpened cutting edge. A pointed tip is defined by the blade flat top side, the tapered sharpened cutting surface and the pair of converging flat surfaces. A hand stop is connected to the top side of the handle. The blade bottom edge is slightly tapered upwardly relative to the blade top edge between the handle and the free end area at the sharpened cutting edge.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

DESCRIPTION OF THE DRAWINGS

FIG. 1 is a sideview of the drywall saw in accordance with the present invention;

FIG. 2 is in underside view of the drywall saw taken along line 2—2 of FIG. 1;

FIG. 3 is a topside view of the drywall saw taken along line 3—3 of FIG. 1;

DETAILED DESCRIPTION OF THE INVENTION

Figure 4:
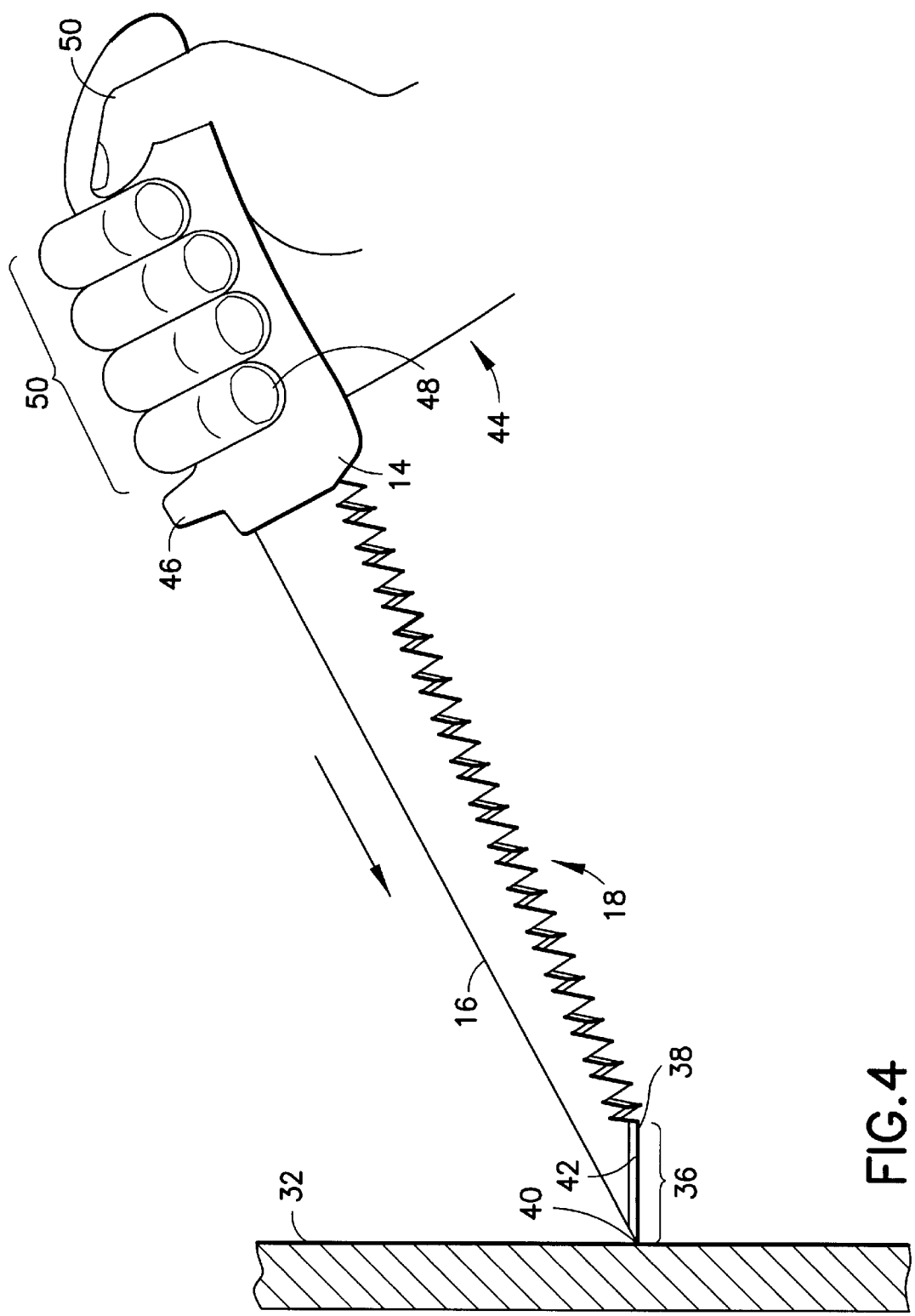
FIG. 4 is a side elevational view of the drywall saw being gripped by a user with the fingers overlying the handle positioned for a plunging motion at the moment of impact against a drywall shown in section in a vertical position.

Reference is now made to the drawings and in particular to FIGS. 1–7 in which identical or similar parts are designated by the same reference numerals throughout.

A drywall hand saw 10 shown in FIGS. 1–3 includes an elongated blade 12 connected to a handle 14. As best seen in FIGS. 1 and 2.

Figure 7:
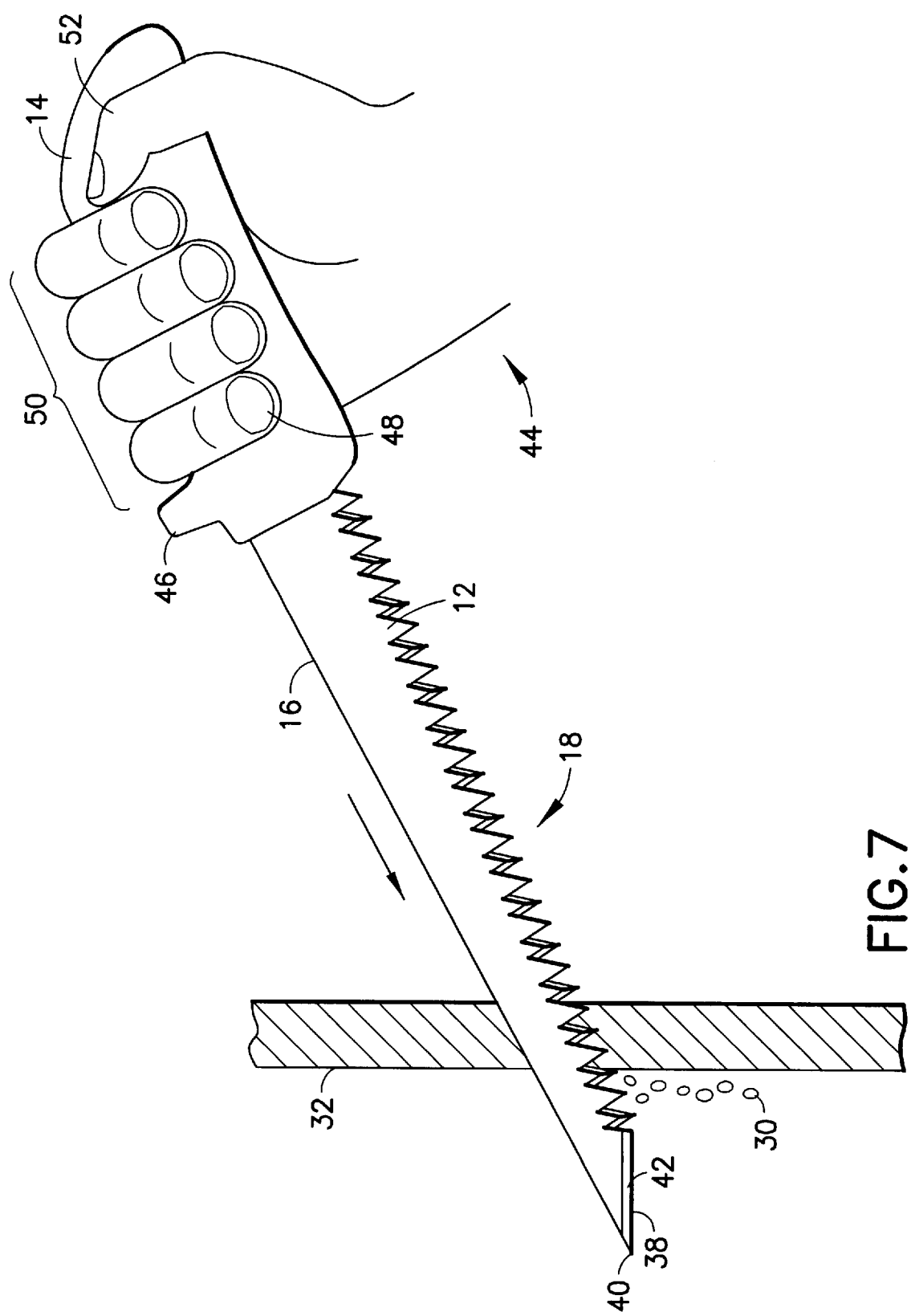
FIG. 7 is a side elevational view of the drywall saw and the side wall similar to the view shown in FIG. 5 with the entry of the blade of the drywall saw through the drywall having been accomplished and a keyhole defined.

Elongated blade 12 has generally opposed blade top and blade bottom edges 16 and 18 respectively. Blade top edge 16 is flat and blade bottom edge 18 is configured with a plurality of individual offset saw teeth 20 are one configuration of offset saw teeth specially adapted to cutting drywall of a number of configurations known in the art that pass the particles of drywall during the sawing operation so as not to bind up the saw. The plurality of individual offset saw teeth 20 are set in two parallel rows 22 and 24 positioned in alternate sequence at 8 teeth per inch. Saw teeth 20 include teeth tips 26. Saw teeth 16 define opposed clean out spillways 28 in alternate sequence for passing crumbled drywall material 30 cut from drywall sheet 32 during the cutting operation as shown in FIG. 7.

As shown best in FIGS. 1 and 2, blade 12 includes an inner end 34 and an opposed free end area 36. Inner end 34 is secured to handle 14. Free end area 36 includes a blade sharpened cutting edge 38 that is tapered upwardly from blade bottom edge 18 to blade top edge 16 to a pointed tip 40.

Sharpened cutting edge 38 is formed by a pair of inwardly tapered flat surfaces 42 of blade 12 between blade top and bottom edges 16 and 18 at free end area 36 that converge at sharpened cutting edge 38. Pointed tip 40 is defined by blade flat top edge 16, blade tapered sharpened cutting edge 38 and pair of converging flat surfaces 42.

FIG. 4 shows the right hand 44 of a user gripping handle 14 with the grip associated with the plunging motion that is commonly used for striking an object with force. Handle 14 includes a hand stop 46 that extends upwardly from the topside of handle 14 proximate to inner end 34 of blade 12. Hand stop 46 braces hand 44 specifically at the little finger 48 of the fingers 50 of hand 44 when pointed tip 40 makes contact with uncut drywall sheet 32. During the plunging operation, fingers 50 overlie handle 14 with the thumb 52 behind in the position common during a strong downward thrust.

Figure 5:
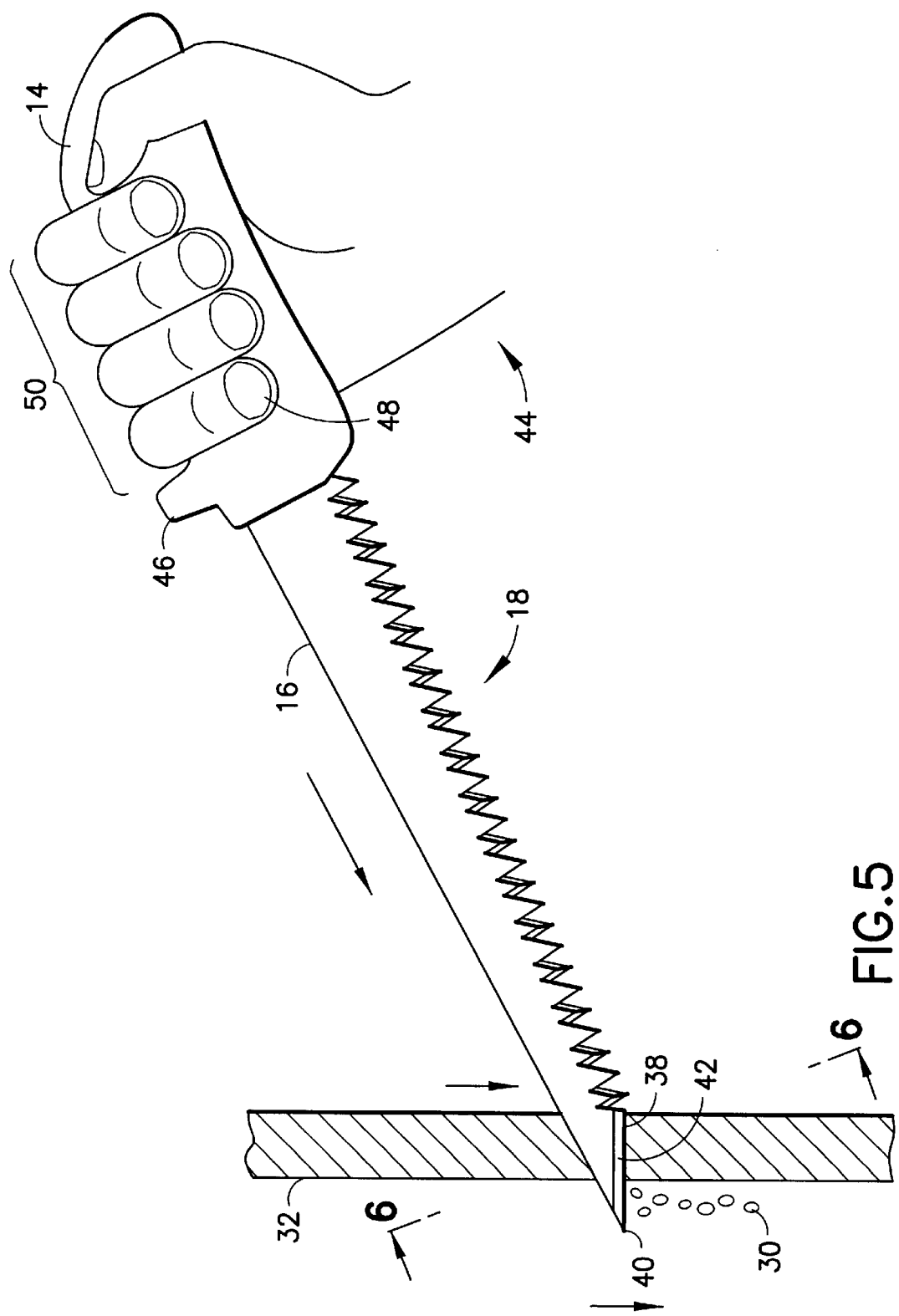
FIG. 5 is a side elevational view of the drywall saw and the drywall similar to the view shown in FIG. 4 with the blade having penetrated and entered the drywall.
Figure 6:
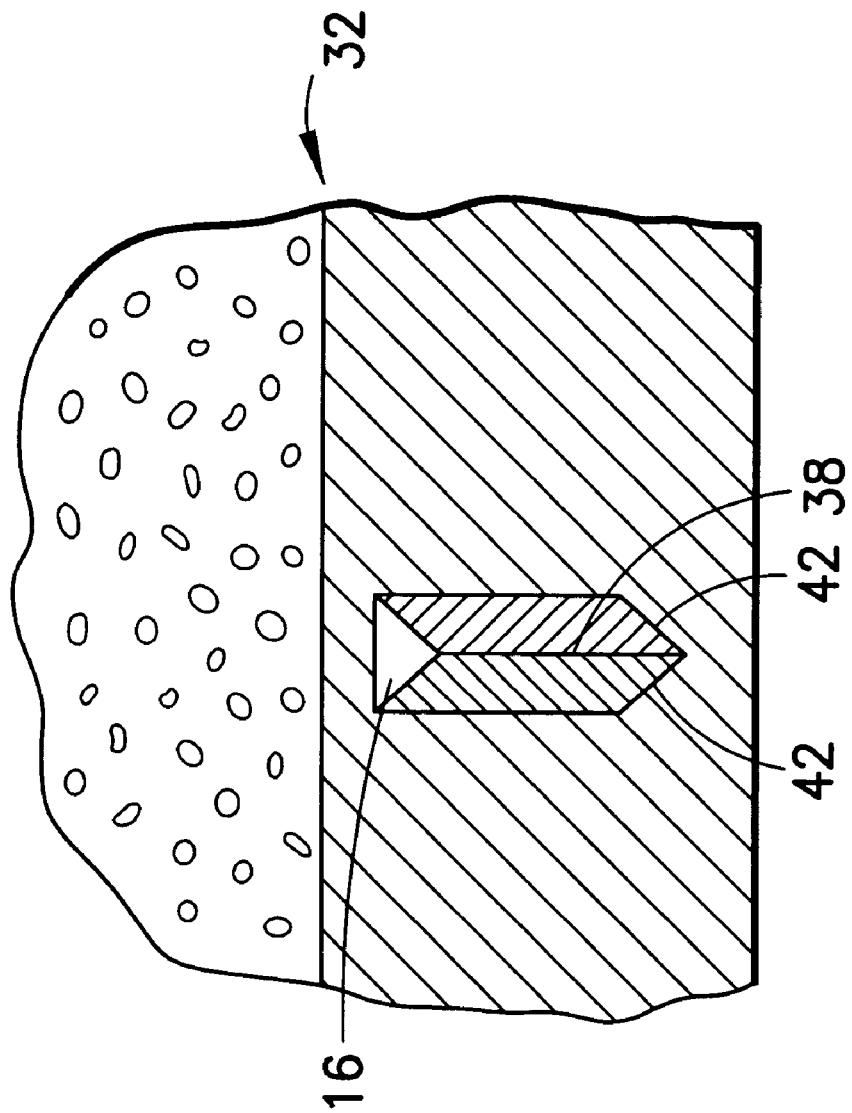
FIG. 6 is a frontal view of the blade of the drywall saw during the plunging operation taken along line 6—6 of FIG. 5.

FIGS. 5 and 6 show pointed tip 40 having penetrated drywall sheet 32 with sharpened edge 38 in downward pressing contact with a portion of drywall sheet 32 thus engaging in a cutting operation against drywall sheet 32 during entry into drywall sheet 32.

FIG. 7 shows the completion of the plunging operation of blade 12 where a keyhole 54 has been made. FIG. 7 shows some crumbled drywall material 30 being ejected from the far side surface 54 of drywall sheet 32 caused by the initial sawing action of offset saw teeth 20 during the plunge stroke.

Figure 8:
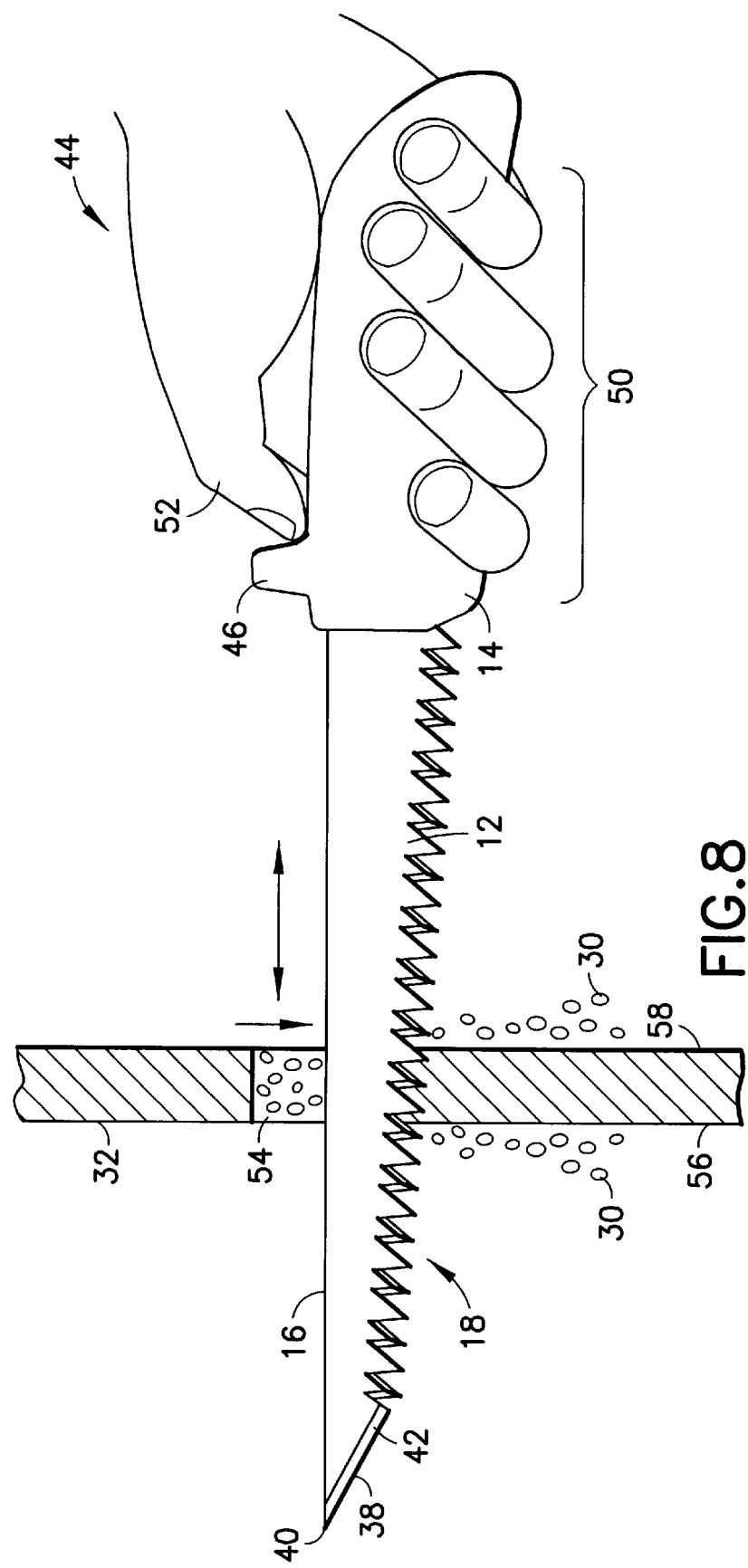
FIG. 8 is a side elevational view of the blade of the drywall saw positioned in the keyhole and the user sawing the drywall in a normal sawing motion with the fingers of the user being positioned under the handle and the thumb pressed against the hand stop.

FIG. 8 shows the user hand 44 of the user in a sawing mode position with thumb 52 pressing against hand stop 46 with user hand 44 of the user now reversed from the position shown in FIGS. 4, 5, and 7 with fingers 50 underlying handle 14. Here drywall hand saw 10 is being operated in its basic mode of a normal sawing operation cutting drywall 32 into a required shape. Crumbled drywall material 30 is shown being ejected from saw teeth on both the far side surface 56 and the near side surface 58 of drywall sheet 32 relative to the position of the user.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims.

What is claimed is:

1. A handsaw for first penetrating and then sawing dry wall comprising:
    a handle,
    an elongated blade comprising a proximate end adjacent to the handle and a distal end tip, further comprising a top edge and a bottom edge, said top edge having a taper extending from said proximate end to said tip,
    said bottom edge having a first taper extending from said proximate end to a distance from said tip and having a second taper extending from said first taper to said tip,
    said blade bottom edge comprising offset saw teeth disposed along said first taper and a cutting edge disposed along said second taper.

2. The hand saw of claim 1, wherein the offset saw teeth are aligned in two parallel rows in alternate sequence.

3. The handsaw of claim 1, wherein the top blade edge is free of curvature.

4. The handsaw of claim 2, wherein the offset saw teeth are aligned in two parallel rows in alternate sequence.

5. The handsaw of claim, wherein the bottom edge second taper is less acute to the bottom edge first taper.

6. The handsaw of claim 1, said blade comprising oppositely disposed sides, said sides being in parallel disposition except at said cutting edge.

7. The handsaw of claim 6, said cutting edge comprises an about a 90° tip edge.

8. The handsaw of claim 7, wherein said teeth means include offset saw teeth.

9. The handsaw of claim 8, set offset saw teeth comprise 8 teeth per inch.

10. The handsaw of claim 7, said teeth extend from said distal tip portion to said bottom edge proximate end.

* * * * *